A. MORAND.
Brick-Machine.
No. 166,544. Patented Aug. 10, 1875.
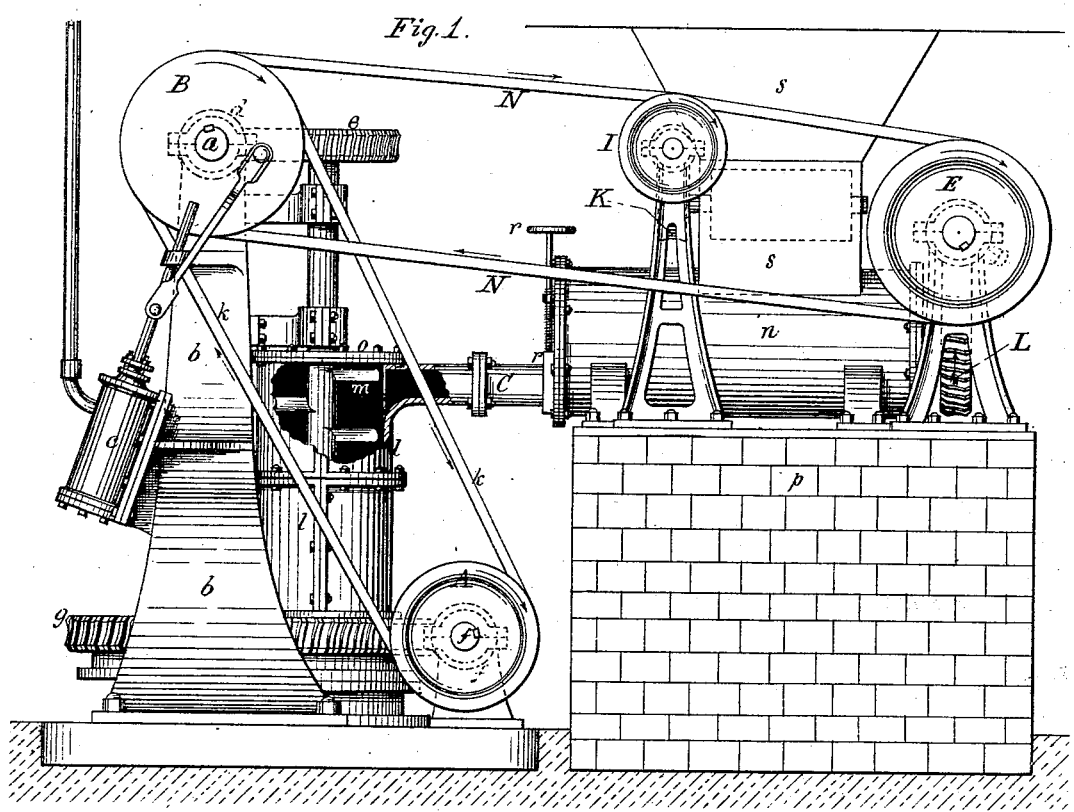
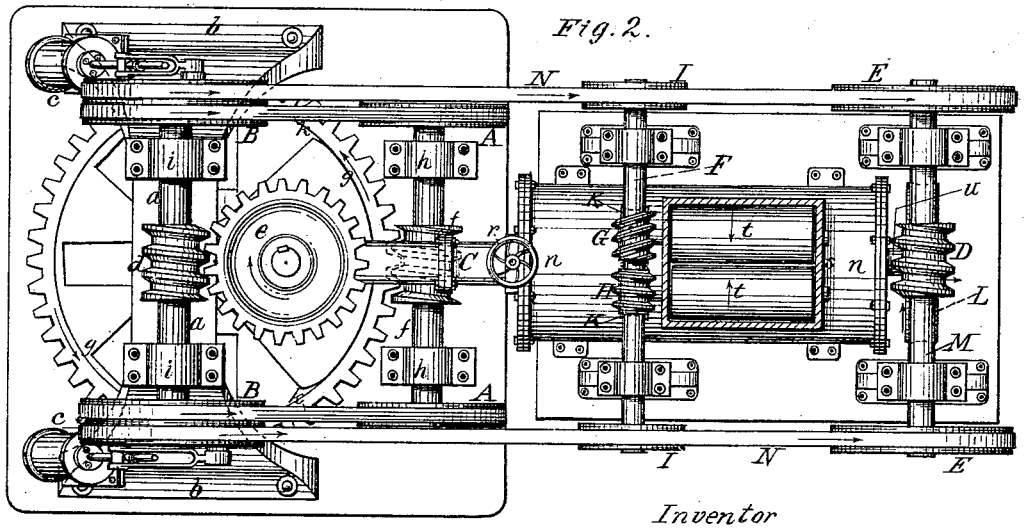
Witnesses:
William E. Bullock
Chas. M. Higgins.
Inventor
Augustus Morand.
Per Burke & Fraser.
attorneys.

UNITED STATES PATENT OFFICE

AUGUSTUS MORAND, OF GERMANTOWN, PENNSYLVANIA.

IMPROVEMENT IN BRICK-MACHINES.

Specification forming part of Letters Patent No. 166,544, dated August 10, 1875; application filed November 27, 1874.

*To all whom it may concern:*

Be it known that I, AUGUSTUS MORAND, of Germantown, Pennsylvania, late of Brooklyn, New York, have invented certain new and useful Improvements in Brick-Making Machinery, of which the following is a specification:

Figure 1 of the annexed drawings is a side elevation of my improved machine, and Fig. 2 is a plan of the same.

The first part of my invention relates to that class of brick pressing or molding machines which are driven by screw or worm gearing, and for which Letters Patent of the United States were granted me June 27, 1871, and September 3, 1872; and it consists in providing the driving or worm shafts of the machine with a pulley on each of their ends, and connecting the opposite pulleys of both shafts by belts, so as to balance the said shafts, and prevent the partial tilting thereof, which takes place when a single pulley is used, and thereby prevent an unequal and injurious strain, and greatly reduce the friction thereon.

As represented in the drawings, $a\ a$ is the main or driving shaft of the machine, mounted upon the top of the upright frame $b\ b$, and driven by the engines $c\ c$ upon each side of the machine. The shaft $a$ is provided with the worm $d$, which gears with the worm-wheel $e$ of the pug-mill $l$. At the lower part of the machine is mounted a second worm-shaft, $f$, which gears with and drives the toothed rotating table or mold-wheel $g\ g$, and which shaft is driven by the main shaft $a$.

In this gearing, as will be understood, a great strain or side thrust is brought upon the worm-shafts in the direction of their length by the reactive strain of driving, the resulting tendency of the shafts to move to one side being resisted by a series of thrust-collars arranged within the journal-boxes $h\ i$. Heretofore the worm-shafts $a\ f$ have been geared with each other by a single pulley and belt upon one end of the shafts, which caused the driving strain of the belt to bear upon one end only of the shafts, and thus produced a partial tilting thereof, causing the edges of the thrust-collars on the worm-shafts to cut into the sides of their sockets, and thus cause the side thrust to act at a much greater disadvantage and engender an immense degree of frictional resistance, requiring a large amount of power to overcome it, and causing an irregular and impulsive motion of the machine, and a rapid wearing away of the parts. To overcome this is one of the objects of my present invention, which I accomplish by arranging upon each end of the worm-shaft $a\ a$ a driving pulley, B B, and by likewise arranging on each end of the worm-shaft $f$ a driving-pulley, A A, in line with the pulleys B B, and connecting the opposite pulleys A B by the endless belts $k\ k$, preferably of the V form, as shown. This brings the driving strain equally on each end of the shafts, and causes them to lie straight in their bearings, and maintain the thrust-collars in true position in their sockets, consequently the side thrust on the worm-shafts acts at a much less disadvantage. The friction is thereby greatly reduced, and the motion smooth and regular. Indeed, to such an extent is this the fact, that in actual practice I am enbled by this improvement to dispense with fully one-third the power which has been heretofore required.

The second feature of my invention relates to the arrangement of the clay-inlet of the pug-mill.

Heretofore the clay has been admitted to the pug-mill through an open hopper in the top, which is objectionable for the reason that the clay falls on the top of the propelling-knives, and is not immediately acted upon thereby, and from the liability of extraneous matter being admitted through the open hopper, especially air, which, from the relative position of the blades to the incoming clay, as well as from the top being open, becomes entangled in the incoming masses of clay, and by the subsequent kneading action of the knives is incorporated therewith in the body of the pug-mill, causing the brick molded therefrom to be filled with a number of small air-cells, which are, of course, compressed in the process of molding, and their subsequent expansion causes the brick to swell when relieved from the pressure of the molds, thus destroying its proper shape.

My improved arrangement consists, as shown in Fig. 1, in situating the clay-inlet C, which leads from the clay grinding and tempering machine $n$, so as to open into the side of the pug-mill $l$, and below the upper knife or propelling-blade $m$. This arrangement enables the top of the pug-mill to be entirely closed, as shown at o, Fig. 1, thus insuring the exclusion of extraneous matter, the admixture of air with the clay being rendered impossible, as well from the top being closed as from the relative position of the clay-inlet to the blades, this position being such that the incoming clay is immediately acted upon by the blades, and the resulting action is regular and harmonious.

The remaining features of my invention relate to the clay grinding and tempering machine, shown on the right in the drawings, and used in connection with the brick-pressing machine on the left, which will be now described.

This machine is composed of a horizontal cylinder, n, securely bolted to a strong foundation, p, and having arranged within it a central shaft, u, provided with a spirally-arranged series of cutting and propelling blades, one end of which shaft projects beyond one end of the cylinder for the application of power thereto. From the opposite end of the cylinder a conduit, C, extends, and opens into the side of the pug-mill l of the brick-presser, as before described, and is provided with a valve, r, to control the passage of the tempered clay. A large hopper, s, opens into the top of the cylinder n, and receives the crude clay, the bottom of which hopper is closed by a pair of rollers, t t, Fig. 2, (shown in dotted lines in Fig. 1,) one of which rollers moves at twice the speed of the other. These rollers crush and feed the crude clay into the cylinder n, where it is tempered by the action of the revolving blades, and propelled through the conduit C into the pug-mill l.

The machine, as thus described, has been heretofore driven by spur-gearing, which necessitated a complicated arrangement of wheels and shafts, rendering the machine heavy and cumbrous, and necessarily requiring a large amount of power for its propulsion.

It is the object of my invention to drive the same by worm-gearing, and thus simplify the construction and economize the power, which I effect as follows: On the end of the horizontal shaft u of the cylinder n I arrange a worm-wheel, L, and I mount horizontally over this wheel, and at right angles to the shaft u, a driving-shaft, M, provided on each end with a driving-pulley, E E, and at its center with a worm, D, which meshes with the worm-wheel L. I also provide the spindles of the rollers t t on one end with small worm-wheels K K, (shown by dotted lines in Figs. 1 and 2,) and mount over them, in a manner similar to that just described, a driving-shaft, F, also provided on each end with a pulley, I I, and at its center with two worms, G H, which mesh with the worm-wheels K K. In order to produce the necessary opposite motion of the rollers one of the worms is formed with a right-hand thread, while the other is formed with a left-hand thread, and, in order to produce the requisite relative speed, one of the worms is formed with a single thread, and the other with a double thread, as represented in Fig. 2, which, as will be understood, effectually accomplishes the desired end, imparting to the rollers a relatively opposite motion, and a double speed to one of them. Power is communicated to the worm-shafts M and F by two belts, N N, of the V form preferably, one on each side of the machine, as shown in Fig. 2, driven from the main pulleys B B, one side of which belts passes over the periphery of the pulleys I I on their way to the large pulleys E E, around which they wind, thus imparting motion to the driving-shafts, and in such a way as to bring the driving-strain equally on both ends of the worm-shafts F M, causing them to lie straight and balanced in their bearings, and generally equalizing the strain on the machine.

When preferred, the small pulleys I I may be driven by special belts from the pulleys A A, or from some other of the large pulleys.

It will be seen that the clay-tempering and brick-molding machinery are driven from the same power-shaft, a. This insures the two machines always moving at the same relative speed, so that the supply of the clay-machine is uniformly equal to the demand of the brick-machine, and will so continue with unvarying regularity.

This arrangement obviates a cause of considerable inconvenience heretofore experienced in this class of machinery from the clay and brick machines being driven by different sources of power, necessarily, as will be seen, rendering the machines liable to disproportionate speed and irregular running.

By these improvements I am enabled to produce a brick-machine of a complete and compact character, of smooth and economical working, and well adapted for the purposes in view.

What I claim as my invention is—

1. The combination of the worm-wheels e and g, worm-shafts a, d, and f, double or balanced pulleys B B and A A, and the belts k k, when constructed and arranged to operate together, substantially in the manner shown, and for the purposes specified.

2. The combination of a brick-pressing machine, constructed substantially as shown, and provided with a vertical receiver, l, for tempered clay, and a horizontal clay-tempering machine, n, connected together by a conduit, C, and a suitable arrangement of pulleys and belts driven from the same motor-shaft, so that the speed of one may be always proportionate to that of the other, substantially in the manner shown, and for the purposes set forth.

In witness whereof I have hereunto signed my name in the presence of two subscribing witnesses.

AUGS. MORAND.

Witnesses:
ARTHUR C. FRASER,
CHAS. M. HIGGINS.